UNITED STATES PATENT OFFICE.

LEOPOLD LANGE, OF CHICAGO, ILLINOIS.

PROCESS FOR RECOVERING SPIRITS FROM INTERNALLY-CHARRED LIQUOR-CASKS WHICH HAVE BEEN ONCE USED.

No. 893,253.  Specification of Letters Patent.  Patented July 14, 1908.

Application filed June 14, 1907. Serial No. 378,914.

*To all whom it may concern:*

Be it known that I, LEOPOLD LANGE, a citizen of the United States of America, residing at Chicago, in the county of Cook and State of Illinois, have discovered a new and useful Process for Recovering Spirits from Internally-Charred Liquor-Casks Which Have Been Once Used.

It has been well known for some time that such casks after use contain a quantity of spirits which is contained in the cells of the charred interior. Various methods have been attempted to recover the cellularly contained spirits from such charred casks.

The object of my invention is to accomplish this purpose in a simple, effective and economical manner.

To this end, my invention consists in the novel process herein set forth and explained and more particularly pointed out in the claims.

In carrying out my process, I first charge said empty casks with a small quantity of water, preferably from two to five gallons, and close the cask, thereafter agitating the water by movement of the cask, such, for example, as rolling, upending or otherwise, so that the contained water will thoroughly saturate the interior of the cask. After this is done, I permit the charged cask to stand for a period of time, depending upon the condition of the cask, at intervals agitating the contents as before. I have secured very good results by letting the charged cask stand a period of time, approximately, 72 hours, agitating the same at intervals as stated. In freshly emptied casks however, this time may be shortened considerably. After letting the casks stand as stated, I then draw off the contents and re-distil the same in the well known manner to recover the spirits. This procedure, I usually continue a plurality of times generally running from 3 to 5, according to the condition of the cask, and I find that by this process, substantially all of the contained spirits is recovered, the total amount recovered sometimes equaling nearly a gallon to a cask and seldom running below one-half gallon.

A larger quantity of water may be satisfactorily employed, with the single exception, that by thus increasing the bulk, the expense of re-distilling is correspondingly increased, therefore, I find it more satisfactory and more economical to use a comparatively small quantity of water as stated. My experience in actual practice also shows that the best results are secured by keeping the temperature of the water in the barrel as nearly equable as may be. As the temperature falls, the results are not as satisfactory, while if the temperature reaches the point to generate steam, I also do not find the result as satisfactory, the expense necessary to maintain such a temperature generally increasing the cost of the process. I have secured the best results by maintaining a temperature of the water at from 60 to 80 degrees Fahrenheit.

My understanding of the process is, that the water being of greater specific gravity than the spirits, and aided by a well known affinity of alcohol for water, seeks out the spirits in the cells of the charred interior and displaces the same, the water filling the cell and the spirits commingling with the contained water in the cask.

What I claim as new and desire to secure by Letters Patent is,

1. The herein described process of recovering the cellularly contained spirits from internally charred liquor casks, comprising, 1st., charging said casks with a small quantity of water and after closing the casks, agitating the water by movement of the cask, 2nd., letting the charged cask stand a period of time sufficient to secure a mutual solution, by diffusion, of the water and alcohol at intervals agitating the contents thereof as before, and 3rd., drawing off the contents and re-distilling the same to recover the spirits therefrom.

2. The herein described process of recovering cellularly-contained spirits from an internally charred liquor cask, which consists (1) in charging said cask with a comparatively small quantity of water, and, after closing the cask, agitating the contents, by the movement of the cask, (2) letting the charred cask stand for a period of time sufficient to secure a complete mutual solution, by diffusion, of the water and alcohol, at intervals agitating the contents, as before, (3) drawing off the contents, (4) repeating the steps a plurality of times and (5) finally distilling the aggregate quantity of fluid recovered from the several charges.

3. The herein described process of recovering the cellularly contained spirits from internally charred liquor casks, comprising, 1st., charging said casks with a comparatively small quantity of water and after closing the cask, agitating the water by movement of the cask, 2nd., letting the charged cask stand a period of time sufficient to secure a mutual solution by diffusion, of the water and alcohol, at intervals agitating the contents thereof as before and maintaining an equable temperature of the contents at between 60 to 80 degrees Fahrenheit, and 3rd., drawing off the contents and re-distilling the same to recover the spirits therefrom.

In testimony whereof, I have signed my name in the presence of two witnesses.

LEOPOLD LANGE.

Witnesses:
 BURTON U. HILLS,
 CHARLES I. COBB.